United States Patent [19]
Terada et al.

[11] Patent Number: 5,102,950
[45] Date of Patent: Apr. 7, 1992

[54] WATER SOLUBLE FILM

[75] Inventors: Kazutoshi Terada; Hirotoshi Miyazaki; Hitoshi Maruyama, all of Kurashiki, Japan

[73] Assignee: Kuraray Co., Ltd., Kurashiki, Japan

[21] Appl. No.: 735,687

[22] Filed: Jul. 29, 1991

Related U.S. Application Data

[63] Continuation of Ser. No. 384,794, Jul. 25, 1989, abandoned.

[30] Foreign Application Priority Data

Jul. 27, 1988 [JP] Japan ................... 63-189148

[51] Int. Cl.$^5$ ............................... C08F 16/06
[52] U.S. Cl. ........................ 525/60; 264/331.12
[58] Field of Search ............................. 525/60

[56] References Cited

U.S. PATENT DOCUMENTS

| | | | |
|---|---|---|---|
| 3,009,893 | 11/1961 | Barnes et al. | 524/387 |
| 3,223,687 | 12/1965 | Crowe | 525/60 |
| 3,374,195 | 3/1968 | Bianco et al. | 525/62 |
| 3,677,990 | 7/1972 | Barabas et al. | 525/69 |
| 4,162,242 | 7/1979 | House | 524/387 |
| 4,251,400 | 2/1981 | Columbus | 524/387 |
| 4,323,492 | 4/1982 | Zimmermann et al. | 524/387 |
| 4,383,065 | 5/1983 | Woo et al. | 524/387 |
| 4,469,837 | 9/1984 | Cattaneo | 524/387 |

FOREIGN PATENT DOCUMENTS

| | | | |
|---|---|---|---|
| 0020131 | 7/1970 | Japan | 525/62 |
| 0249633 | 12/1969 | U.S.S.R. | 525/62 |

Primary Examiner—Joseph L. Schofer
Assistant Examiner—J. M. Reddick
Attorney, Agent, or Firm—Oblon, Spivak, McClelland, Maier & Neustadt

[57] ABSTRACT

Provided are water soluble films comprising a modified polyvinyl alcohol containing 2-pyrrolidone ring. The films have excellent water solubility, which can be maintained over a long period of time and under the condition of being contacted with an alkaline or acid substance, and at the same time have an appropriate touch and flexibility.

10 Claims, No Drawings

WATER SOLUBLE FILM

This application is a continuation of application Ser. No. 07/384,794, filed on July 25, 1989, now abandoned.

BACKGROUND OF THE INVENTION

The present invention relates to water soluble films, and more specifically, to water soluble films comprising a polyvinyl alcohol containing pyrrolidone groups.

DESCRIPTION OF THE RELATED ART

Water soluble films are widely used for packaging agricultural chemicals, industrial chemicals, etc.; for packaging gardening seeds; and the like. When dry materials such as washing agents for laundry purpose, agricultural chemicals, industrial chemicals, etc. are packed in a water soluble film, the water soluble film dissolves or disperses upon immersion into water, to permit the contents to dissolve or disperse in the water, whereby the contents can be used with ease without being directly touched. When seeds for gardening are packed in a water soluble film, the film plays the role of a spacer to set distances between the seeds beforehand. Thus, the seeds can be planted with ease by for example simply putting the package in the ground. Then, the packaging film rapidly dissolves in the ground, thereby giving no adverse effect on the growth of the seeds.

Polyvinyl alcohol films have been used as such water soluble film. The polyvinyl alcohol films are tough and transparent as well as have good printability, which are their excellent features. The cristallinity of a polyvinyl alcohol increases as the degree of hydrolysis increases, and since polyvinyl alcohol of high crystallinity does not dissolve in cool water, completely hydrolyzed polyvinyl alcohol films cannot be used as a cool-water soluble film. Partially hydrolyzed polyvinyl alcohols having a degree of hydrolysis of 80 to 90 mol% have been used for that purpose. However, films made of a partially hydrolyzed polyvinyl alcohol have, though they have sufficient cool-water solubility initially after their preparation, a drawback of decreasing the cool-water solubility upon storage for a long period, perhaps because of a gradual growth of the crystals in that period. Furthermore, they also have a drawback of decreasing the cool-water solubility, when the contents packed are alkaline or acid substances such as washing agents for laundry purpose, upon storage over a long time period due to a gradual increase of the degree of hydrolysis of the partially hydrolyzed polyvinyl alcohol.

For the purpose of suppressing the gradual growth of the crystals or retarding the increase of the degree of hydrolysis caused by contact with an alkaline or acid substance, it is effective to use a polyvinyl alcohol having a low degree of hydrolysis. This method however cannot substantially give a satisfactory water soluble film because: in case the degree of hydrolysis is decreased to not more than 80 mol%, the clouding point of the partially hydrolyzed polyvinyl alcohol decreases and the polymer becomes insoluble in hot water; and with the degree of hydrolysis being still lower, the polymer becomes insoluble in water.

Under the above circumstances, water soluble films having improved properties, comprising a modified polyvinyl alcohol have been proposed. Examples of known modified polyvinyl alcohols for this purpose are a carboxyl-group modified polyvinyl alcohol and a hydrolyzed product of copolymer of an allyl ester and a vinyl ester (cf. Japanese Patent Application Laid-Open No. 179550/1987); a vinyl alcohol-methyl butenol copolymer (cf. U.S. Pat. No. 3,441,547); a terpolymer comprising about 60 to 80 wt% of vinyl alcohol units, about 20 to 30 wt% of vinylpyrrolidone units and about 1 to 10 wt% of lauryl methacrylate units, prepared by complete hydrolysis of the vinyl acetate component of a terpolymer comprising vinyl acetate, vinyl-pyrrolidone and lauryl methacrylate (cf. Canadian Pat. 826,732); and the like. All the films made of these modified polyvinyl alcohol films however have drawbacks. The film comprising the carboxyl-group modified polyvinyl alcohol has a large dependency on humidity and, is hard and fragile and readily breaks under low humidities and on the other hand is tacky under high humidities. Furthermore, the carboxyl-group modified polyvinyl alcohol is short of resistance to acid although it has a high resistance to alkali; and the film is difficult to form by melt formation process, since the carboxyl-group modified polyvinyl alcohol readily gels perhaps because of occurrence of esterification by heat between the carboxyl groups and the alcohol groups of vinyl alcohol units. In the cases of the hydrolyzed product of an allyl ester and a vinyl ester and the vinyl alcohol-methyl butenol copolymer, problems are encountered at the production thereof. That is, it is required that a large amount of the allyl ester or methyl butenol be used in the copolymerization since the copolymerizability with vinyl ester of allyl esters or methyl butenol is not so high, and further it is difficult to separate the remaining allyl ester or methyl butenol by distillation after the copolymerization. The water soluble films made of the afore-mentioned terpolymer comprising vinyl alcohol units, vinylpyrrolidone units and lauryl methacrylate units passes insufficient flexibility, and hence the films used for packages are liable to break and spill out their contents when the packages are stored or handled.

Water soluble films having improved properties and comprising a mixture of a polyvinyl alcohol or a modified polyvinyl alcohol with another polymer have also been proposed. Known as such a mixture is a mixture of a water soluble polyvinyl alcohol or modified polyvinyl alcohol such as partially hydrolyzed polyvinyl alcohol and the completely hydrolyzed product of a vinyl acetate-vinylpyrrolidone copolymer, and a water soluble polymer having in the molecular structure thereof both a functional group capable of interacting with hydroxyl group and a hydrophobic group, such as the potassium salt of an acrylic acid-ethyl acrylate copolymer (cf. Japanese Patent Application Laid-Open No. 97348/1986). The water soluble film however has a production problem in that the homogeneous film is difficult to obtain since the two polymers mixed readily undergo phase separation.

SUMMARY OF THE INVENTION

An object of the present invention is to provide a water soluble film comprising a modified polyvinyl alcohol which can be produced efficiently, is capable of maintaining an excellent water solubility over a long period and in the condition of contacting an alkaline or acid substance, and has an appropriate touch and flexibility.

Another object of the present invention is to provide an advantageous process for producing the above-mentioned water soluble film.

Still another object of the present invention is to provide packages containing an alkaline or acid substance packed in the above-mentioned water soluble film.

A mode of the present invention provides water soluble films comprising a 2-pyrrolidone-ring-containing polyvinyl alcohol (hereinafter sometimes referred to as "pyrrolidone-ring-containing PVA") having a degree hydrolysis of 50 to 99 mol% and containing copolymerization units comprising 2-pyrrolidone ring in the molecule thereof in an amount of 1 to 20 mol%.

Another mode of the present invention provides a process for producing water soluble films which comprises heat-melt processing the above pyrrolidone-ring-containing PVA in the substantial absence of water.

Still another mode of the present invention provides packages comprising a bag-like structure made of the above water soluble film and an alkaline or acid substance contained in the bag-like structure.

DETAILED DESCRIPTION OF THE INVENTION

There is no specifical limitation on the process for producing the pyrrolidone-ring-containing PVA used in the present invention but, it is preferred to copolymerize a monomer containing 2-pyrrolidone ring and a polymerizable carbon-carbon double bond (hereinafter sometimes referred to as pyrrolidone-ring-containing momomer) and vinyl ester of an aliphatic acid, since this process is simple and convenient. The 2-pyrrolidone ring of the pyrrolidone-ring-containing monomer is preferably introduced in the form of a group represented by the general formula:

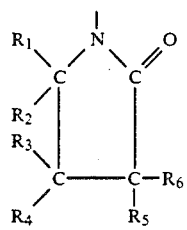

(I)

wherein $R_1$, $R_2$, $R_3$, $R_4$, $R_5$ and $R_6$ represent each a hydrogen atom or an alkyl group. While the alkyl group which may be represented by $R_1$, $R_2$, $R_3$, $R_4$, $R_5$ and $R_6$ is preferably an alkyl group having 1 to 8 carbon atoms, it is more preferred that $R_1$, $R_2$, $R_3$, $R_4$, $R_5$ and $R_6$ represent each a hydrogen atom or a methyl group, and it is particularly preferred that each of them be a hydrogen atom. Preferred examples of the group represented by the general formula (I) are 2-oxopyrrolidin-1-yl group, 3-propyl-2-oxopyrrolidin-1-yl group, 5-methyl-2-oxopyrrolidin-1-yl group, 5,5-dimethyl-2-oxopyrrolidin-1-yl group, 3,5-dimethyl-2-oxopyrrolidin-1-yl group, and the like. Preferred examples of the carbon-carbon double bond contained in the pyrrolidone-ring-containing monomer are vinyl, allyl, styryl, acryloxy, methacryloxy, vinyloxy, allyloxyl and the like groups, among which the most preferred are vinyl group and allyl group from the viewpoints of the copolymerizability with vinyl esters of aliphatic acids and the high alkali resistance at the time of hydrolysis. Examples of the pyrrolidone-ring-containing monomer include N-vinyl-2-pyrrolidone, N-vinyl-3-propyl-2-pyrrolidone, N-vinyl-5-methyl-2-pyrrolidone, N-vinyl-5,5-dimethyl-2-pyrrolidone, N-vinyl-3,5-dimethyl-2-pyrrolidone, N-allyl-2-pyrrolidone, and the like. Among the above, N-vinyl-2-pyrrolidone is the most preferred pyrrolidone-ring-containing monomer.

Examples of the vinyl ester of aliphatic acids include vinyl formate, vinyl acetate, vinyl butyrate, vinyl pivalate, vinyl versatate, and the like, among which vinyl acetate is industrially the most preferred.

Copolymerization of the pyrrolidone-ring-containing monomer and the vinyl ester of an aliphatic acid can be performed by bulk polymerization, solution polymerization, emulsion polymerization, suspension polymerization, and the like, which are known polymerization processes in the production of vinyl polymers but, the solution polymerization process which utilizes methanol as the solvent is industrially suited.

The copolymer of the pyrrolidone-ring-containing monomer and the vinyl ester of an aliphatic acid can be hydrolyzed by alkali hydrolysis or acid hydrolysis which are known to be applicable to polyvinylesters of aliphatic acids, of which hydrolysis using an alkali hydroxide in methanol is preferred, since it is simple and convenient.

The content of a copolymerization component containing 2-pyrrolidone ring in the pyrrolidone-ring-containing PVA used in the present invention is 1 to 20 mol%, and is preferably 2 to 12 mol%, more preferably 2 to 8 mol%. If the content of a copolymerization component containing 2-pyrrolidone ring is too low, the effect of improving the drawbacks inherent to partially hydrolyzed polyvinyl alcohol such as growth of crystals with time and shortage of resistance to alkali or acid will be insufficient, which is not preferred. On the other hand, if the content is too high, the film comprising such PVA will have a large dependency on humidity, and become tacky under high humidities or become hard and fragile under low humidities, which is not preferred either.

The degree of hydrolysis (this expression referred to in the present invention means a ratio of moles of vinyl alcohol units to the total moles of the vinyl alcohol units and the units of the vinyl ester of an aliphatic acid in the molecule) of the pyrrolidone-ring-containing PVA used in the present invention is 50 to 99 mol%, and preferably 65 to 98 mol%, more preferably 65 to 95 mol%. If the degree of hydrolysis is too low, the film obtained will have an insufficient strength and tend to be of low water solubility, which is not preferred. On the other hand, if the degree of hydrolysis is too high, the film obtained will tend to be hard and the heat melt formability will tend to decrease, which is not preferred either. It may be considered, where the degree of hydrolysis is high, to employ a method which comprises using a large amount of a plasticizer to compensate the hardness of the film obtained and to give a heat melt formability. In this case, however, the plasicizer bleeds out of the film obtained to make the film tacky or to impair the transparency of the film. Furthermore, the content of the plasticizer decreases with time due to the bleeding out and migrating out of the plasticizer caused by contact with the contents or external materials, resulting in a great change in the film flexibility with time. The amount of a plasticizer added therefore is preferably as small as possible, and in view of the foregoing, the degree of hydrolysis is preferred to be not so high and preferably not more than 98 mol%, more preferably not more than 95 mol%.

Although the preferred range of the content of a copolymerization component containing 2-pyrrolidone ring and that of the degree of hydrolysis have been discussed independently with each other, the conditions for obtaining still preferred water soluble films can be set by specifying the both ranges interrelating to each other.

Thus, when the content of a copolymerization component containing 2-pyrrolidone is X mol% and the degree of hydrolysis as defined before is Y mol%, it is preferred, as described heretofore, that:

$2 \leq X \leq 8$, and $65 \leq Y \leq 95$ but, if at the same time the condition
$76 - X \leq Y \leq 80 + 3.6X$ is satisfied, a still preferred water soluble film will be obtained. Where the degree of hydrolysis, Y, is not less than (76−X), the pyrrolidone-ring containing PVA has a sufficiently high hydrophilic property and an extremely high rate of dissolution in water. Where the degree of hydrolysis, Y, is not more than (80+3.6X), the effect of suppressing crystallization caused presumably by the presence of the aliphatic residue and 2-pyrrolidone ring is sufficiently high, whereby the crystallization is very difficult to proceed with time.

While the pyrrolidone-ring-containing PVA used in the present invention comprises as essential constituents copolymerization units containing 2-pyrrolidone ring originating from a pyrrolidone-ring-containing monomer, vinyl alcohol units originating from the ester of an aliphatic acid and units of the vinyl ester of an aliphatic acid, it may contain a copolymerization unit other than the above essential constituents in a small amount which will not impair the object of the present invention. The copolymerization unit which may optionally be contained in the pyrrolidone-ring-containing PVA can be introduced in the pyrrolidone-ring-containing PVA by, at the time of copolymerization of a pyrrolidone-ring-containing monomer and the vinyl ester of an aliphatic acid, permitting a monomer other than the foregoing essential monomers to be optionally present in the system with the essential monomers. Examples of the monomer which may be present together with the essential monomers at the copolymerization thereof are anionic monomers, e.g. monomers containing a carboxyl group(s) such as (meth)acrylic acid, maleic acid, maleic anhydride, fumaric acid, crotonic acid, itaconic acid, etc. and salts thereof; monomers containing sulfonic acid group such as sodium 2-acrylamide-2-methylpropane sulfonate, sodium allylsulfonate, sodium vinylsulfonate, etc. and salts thereof; cationic monomers, e g. monomers having a quaternary ammonium structure such as 3-(meth)acrylamido-propyl trimethyl ammonium chloride, etc; and nonionic monomers, e.g. α-olefins such as ethylene and propylene; (meth)acrylates such as methyl (meth)acrylate; amide-group-containing monomers such as acrylamide, N,N-dimethyl acrylamide and N-methylolacrylamide; alkyl vinyl ethers such as ethyl vinyl ether; silyl-group-containing monomers such as trimethoxy vinylsilane; hydroxyl-group-containing monomers such as allyl alcohol, dimethylallyl alcohol and isopropenyl alcohol; acetyl-group-containing monomers including allyl acetate, dimethylallyl acetate and isopropenyl acetate but excluding vinyl acetate; halogen-atom-containing monomers such as vinyl chloride, vinylidene chloride; aromatic monomers such as styrene; and the like. The content in the pyrrolidone-ring-containing PVA of the copolymer unit introduced by the above monomers which may optionally be used is preferably less than 2 mol%, and more preferably less than 1 mol%. Particularly, the content of the ionic copolymer units introduced by the anionic monomers or cationic monomers is, generally, preferably as low as possible, since they increase the humidity dependency of the film obtained, whereby the film becomes hard under low humidities and becomes tacky under high humidities.

There are no particular restrictions as to the polymerization degree of the pyrrolidone-ring-containing PVA used in the present invention but, it is preferably 100 to 4,000, and more preferably 200 to 2,000. With a too low polymerization degree, the strength of the film obtained is sometimes low; and with a too high polymerization degree, the viscosity of the aqeous solution increases and the melt viscosity also increases, whereby the processability at the film formation by casting method or by melt formation becomes sometimes worse.

Known film formation processes including melt formation such as film formation by melt extrusion, blown film process or injection molding; casting process; and the like can be employed for producing the films of the present invention. The melt formation processes, particularly ones in the substantial absence of water are industrially more advantageous over the casting process which requires a large amount of heat at the drying process, in that they can produce the films more economically than the latter. "Substantial absence of water" herein means that a melt formation is conducted without an intentional addition of water and hence includes the case where water is present in a very small amount which raises for example by spontaneous absorption by the resin of moisture from atmosphere. When a melt formation process is employed, it is preferred to use a pyrrolidone-ring-containing PVA having a melt flow index (melt flow rate) of 0.1 to 100 g/10 min determined from the amount of a melted specimen extruded at 190.C and under a load of 2.16 kg through a die having a length of 8.000±0.025 mm and outer and inner diameters of 9.50±0.03 mm and 2.095 ±0.005 mm respectively, according to Japanese Industrial Standard "Testing Method for Melt Flow Rate of Thermoplastics" (JIS K7210-1976), and more preferably one having a melt flow index of 0.3 to 50 g/10 min. A pyrrolidone-ring-containing PVA with too low a melt flow index is insufficient in the fluidity at the time of melting to thereby render the heat melt formation substantially difficult to perform, while one with too high a melt flow index tends to decrease the dimensional stability just after the formation. Generally in the pyrrolidone-ring-containing PVA, the melt flow index increases as the content of a copolymerization component comprising 2-pyrrolidone ring increases and the polymerization degree decreases. In the production of a pyrrolidone-ring-containing PVA, the content of the copolymerization component containing 2-pyrrolidone, the degree of hydrolysis, the polymerization degree and the like are suitably selected taking into consideration the melt formation conditions employed, the desired properties and use of the film to be obtained, and the like, so that the pyrrolidone-ring-containing PVA produced will have an appropriate melt flow index.

There is no particular limitation on the thickness of the water soluble films of the present invention but, it is generally within the range of from 5 to 200 μ. The water soluble films of the present invention may be ones having undergone a surface processing such as embossing, plasma treatment or sticking-prevention treatment.

While the water soluble films of the present invention can well exhibit excellent performances when they comprises a pyrrolidone ring-containing PVA, they may contain, as required, a plasticizer and/or a hygroscopic agent, e.g. a polyhydric alcohol such as glycerine, diglycerine, ethylene glycol, diethylene glycol, triethylene glycol, polyethylene glycol, trimethylolpropane, pentaerythritol, 2,3-butane-diol or 1,3-butanediol; an amide such as dimethylacetamide; an amine such as triethanolamine; a sulfoxide such as dimethyl sulfoxide; or the like. In the water soluble films of the present invention, the addition of linear sugaralcohol having 4 to 6 carbon atoms will improve the borate ion resistance of the films. Examples of the linear sugaralcohols having 4 to 6 carbon atoms include tetritols having 4 carbon atoms such as threitol and erythritol; pentitols having 5 carbon atoms such as arabitol, ribitol, xylitol and lyxitol; and hexitols having 6 carbon atoms such as glucitol, mannitol, iditol, gulitol, talitol, galactitol, allitol, altritol and sorbitol. These linear sugaralcohols are polyhydric alcohols produced by reducing linear sugar having 4 to 6 carbon atoms to thereby convert the formyl group and carbonyl group contained therein to methylol group and hydroxymethylene group respectively. As the linear sugaralcohol, either an optical isomer or a mixture of 2 or more optical isomers can be used. Among the above sugaralcohols, preferred are hexitols having 6 carbon atoms, particularly mannitol and sorbitol, in view of their high effect of improving the resistance to borate ion of the film to be obtained. Where the number of carbon atoms of linear sugaralcohols is not more than 3, the effect of improving the resistance to borate ion of the film to be obtained is often insufficient, and where the number of carbon atoms of linear sugaralcohols is at least 7 the film obtained is often hard. The use of a linear sugaralcohol having a carbon number of not more than 3 or at least 7 therefore is generally not preferred. The improvement in the resistance to borate ion of the water soluble films according to the present invention is particularly preferred when the water soluble films are used for "unit packing" of a washing agent. Many of washing auxiliaries such as soft-finishing agents and bleaching agents often comprise compounds containing borate ion. When a package containing a washing agent is in storage or when washing is performed with the package containing a washing agent and a washing auxiliary, it sometimes occurs that the pyrrolidone-ring-containing PVA undergoes crosslinking by action of borate ions, thereby causing the film to insolubilize. Such insolubilization of water soluble films is suppressed by the improvement in the resistance to borate ion of the water soluble films. Further, a perborate is often used as an oxygen-bleaching agent which sometimes is incorporated in or used together with a washing agent at washing; and such perborate decomposes during the storage and use to form borate ion. In this case also the improvement in the resistance to borate ion of the films is effective. The ratio of the linear sugaralcohol having 4 to 6 carbon atoms added in a water soluble film when the water soluble films of the present invention are used for packaging a washing agent is preferably 2 to 30 parts by weight based on 100 parts by weight of the pyrrolidone-ring-containing PVA, and more preferably 4 to 15 parts by weight on the same basis. If the ratio of the linear sugaralcohol added is too low, the effect of suppressing insolubilization of the film caused by borate ion will sometimes be insufficient. On the other hand, if the ratio of the addition is too high, the transparency of the film obtained will sometimes be impaired perhaps because of bleeding out of the linear sugaralcohol.

The water soluble films of the present invention may also contain a water soluble or water dispersible resin such as conventional polyvinyl alcohol, polyacrylic acid or salts thereof, polyacrylamide, starch or cellulose such as hydroxypropylcellulose, hydroxypropylmethylcellulose or methylcellulose. Further they may contain a pigment such as clay, talc, titanium oxide or calcium carbonate; a color; a surfactant or an agent for giving slip property.

The reason why the water soluble films of the present invention are excellent in water solubility and at the same time in resistances to alkali and acid but, it is considered that there is a large effect resulting from the pyrrolidone ring contained in the pyrrolidone-ring-containing PVA used in the present invention. The pyrrolidone ring has a large affinity to water to thereby play a role of increasing the water solubility of the film obtained. It also acts as an alien bond which hinders the growth of crystals, thereby substantially suppressing the decrease in the water solubility of the film caused by gradual crystallization with time. Further, even in the case where the degree of hydrolysis of the pyrrolidone-ring-containing PVA increases by contact with an alkaline or acid substance, the decrease in the water solubility is minimized thanks to the suppression of crystallization by action of the pyrrolidone ring, which fact is thought to be endowing the film with resistances to alkali and acid.

In addition to the above-described effect which is considered to be resulting from the pyrrolidone ring, adjustment of the degree of hydrolysis of the pyrrolidone-ring-containing PVA can suitably control the strength and flexibility of the water soluble film to be obtained. Accordingly, water soluble films having the desired properties depending on the purpose can be produced.

The water soluble films of the present invention can utilize modified polyvinyl alcohols having a decreased melting temperature and melt viscosity thanks to effects which are considered to be originating from the presence of pyrrolidone ring. This fact can make possible extrusion formation and the like melt formation processes in the substantial absence of water in the same manner as in the formation of conventional thermoplastic resins, which is one of the excellent features of the present invention, while conventional polyvinyl alcohols can employ an melt formation process only when they are in the form of concentrated aqueous solution.

The pyrrolidone-ring-containing PVA's used in the present invention are markedly suited for commercial production from the following points. Firstly, since pyrrolidone-ring-containing monomers, particularly vinylpyrrolidone, are excellent in copolymerizability with vinyl esters of aliphatic acids, the pyrrolidone-ring-containing monomer used is mostly introduced into the copolymer obtained and thus the efficiency of reaction of the monomer is extremely high. Secondly and in particular, even in the case where a small amount of the pyrrolidone-ring-containing monomer, particularly vinylpyrrolidone, remains in the system after completion of the copolymerization, such remaining pyrrolidone-ring-containing monomer and the vinyl ester of the aliphatic acid used can readily be separated by distillation.

The water soluble films of the present invention can widely be used for packaging dry materials or liquids containing no water, including washing agents for laundry purpose, insecticides, bleaching agents, cleaning agents, toiletry goods, industrial chemicals, etc., as "laundry bag" (bag for temporarily placing therein clothes to be washed), for packaging seeds for gardening, and for the like uses. They are particularly suited for use in packaging such chemicals as sodium hydroxide, sodium carbonate, citric acid and sulfonamides, and for packaging alkaline or acid substances such as washing agents and bleaching agents, since they have excellent resistances to alkali and to acid.

Other features of the invention will become apparent in the course of the following descriptions of exemplary embodiments which are given for illustration of the invention and are not intended to be limiting thereof. In the Examples, "parts" and "%" mean "parts by weight" and "% by weight" respectively, unless otherwise indicated.

EXAMPLES

Synthesis Example of pyrrolidone-Ring-Containing PVA

A polymerization vessel equipped with a reflux condenser was charged with 2,800 parts of vinyl acetate, 650 parts of methanol and 54.3 parts of N-vinyl-2-pyrrolidone, and after heating of the mixture to 60° C. the atmosphere inside the vessel was replaced by nitrogen. Polymerization was initiated by further addition of 0.23 part of 2-mercaptoethanol, 2.53 parts of $\alpha\alpha'$-azobisisobutyronitrile and 50 parts of methanol. After the start of the polymerization, while the temperature in the vessel was kept at 60° C., 106 parts of N-vinyl-2-pyrrolidone and 85.5 parts of a 6% solution of 2-mercaptoethanol in methanol were added over 4 hours at a constant rate. Four hours after the start of the polymerization, 1,000 parts of methanol was added and the mixture was cooled to stop polymerization. The then polymerization ratio of vinyl acetate was 60%. The residual vinyl acetate was distilled off while methanol vapor was added to the reaction mixture obtained, and a 50% solution of a polyvinyl acetate containing 2-pyrrolidone ring in methanol was obtained. To 500 parts of the solution thus obtained, 323 parts of methanol and 10.5 parts of a 4% sodium hydroxide solution in methanol were added, and hydrolysis reaction was conducted at 40° C. The gel-like substance obtained was pulverized, washed well with methanol and dried to give a pyrrolidon-ring-containing PVA (hereinafter referred to as "polymer [A]"). The amount of the volatile matter of polymer [A] was not more than 0.1%. NMR measurement revealed that the content of N-vinyl-2-pyrrolidone was 6.0 mol% and the degree of hydrolysis was 84 mol%. The polymerization degree of polymer [A] was 430. The melt flow index of polymer [A] as determined from the amount of the melt extruded through a die at 190° C. and under a load of 2.16 kg according to JIS K7210-1976 was 5.0 g/10 min.

Copolymerization reactions of N-vinyl-2-pyrrolidone and vinyl acetate and hydrolysis reactions of the obtained polyvinyl acetate polymers containing 2-pyrrolidone ring were conducted in the same manner as above to synthesize 12 kinds of pyrrolidone-ring-containing PVA's (hereinafter these polymers are referred to as "polymers [B], [C], [D], [E], [F], [G], [H], [I], [J], [K], [L] and [M]") The data of these polymers and also polymer [A] are shown in Table 1.

TABLE 1

| Polymer Code | Content of N-vinyl-2-pyrrolidone unit (mol %) | Degree of hydrolysis (mol %) | Polymerization degree | Melt flow index (g/10 min) |
|---|---|---|---|---|
| Polymer [A] | 6.0 | 84 | 430 | 5.0 |
| Polymer [B] | 4.0 | 80 | 750 | 1.4 |
| Polymer [C] | 12.5 | 85 | 1100 | — (*1) |
| Polymer [D] | 1.5 | 81 | 1500 | — (*1) |
| Polymer [E] | 4.0 | 69 | 380 | 42 |
| Polymer [F] | 3.5 | 94 | 650 | — (*1) |
| Polymer [G] | 6.0 | 97 | 430 | — (*1) |
| Polymer [H] | 7.0 | 99 | 500 | — (*1) |
| Polymer [I] | 12.5 | 75 | 1100 | 1.7 |
| Polymer [J] | 7.0 | 82 | 1450 | 0.19 |
| Polymer [K] | 10.5 | 71 | 1100 | — (*1) |
| Polymer [L] | 3.5 | 91 | 1500 | — (*1) |
| Polymer [M] | 6.5 | 100 | 480 | — (*1) |

(*1) Melt flow indices not calculated yet.

EXAMPLE 1

Polymer [A] was formed into a film having a thickness of 40 μm by casting its 13% aqueous solution with a drumtype film formation machine at a drum temperature of 70° C. Two specimens of the film thus obtained were separately conditioned for 1 week at 20° C. and 40% RH and at 20° C. and 84% RH, respectively, and then subjected to evaluation for the flexibility, tackiness, etc.

Separately, a specimen of the film was conditioned at 20° C., 65% RH and held tight between a pair of board paper sheets each having a hole of 3×3 cm, and the set was then fixed using a stapler. The set was immersed in water at 20° C. and the time required for the complete dissolution of the film was measured (hereinafter the test of this kind is referred to as "water solubility test"). Another specimen of the film was heat treated at 180° C. for 30 minutes to give a film in which crystallization had been accelerated. The film thus treated was also subjected to the above water solubility test at 20° C.

Still another sheets of the film were each made into a bag having a size of 5 cm×10 cm. The bags thus prepared were each charged with 30 g of sodium cabonate decahydrate or 30 g of citric acid, and sealed with a heatsealer. The packages thus prepared were allowed to stand still for 2 months under conditions of 40° C. and 80% RH. After 2 months, the bags were opened and, after thorough removal of the contents, subjected to the above water solubility test.

Further, a sheet of the film was conditioned at 20° C., 40% RH for 1 week, and then made into 10 bags having a size of 5 cm×10 cm. The bag each was charged with 30 g of sodium carbonate decahydrate and sealed with a heatsealer. The packages thus prepared were dropped from the height of 3 m under an atmospheric condition of 20° C. and 40% RH. The dropped bags were visually checked for cracks and breaks, and the number of the bags having any crack or break among the 10 bags was recorded (hereinafter this test is referred to as "breakage test").

The results of the above touch test, water solubility test and breakage test are summarized in Table 2.

EXAMPLES 2 THROUGH 8

Example 1 was repeated except for changing polymer [A] to polymers [B], [C], [D], [E], [F], [G] or [H] respectively. The results obtained are also given in Table 2.

COMPARATIVE EXAMPLE 1

Example 1 was repeated except for using a polyvinyl alcohol having a polymerization degree of 550 and a degree of hydrolysis of 80 mol%. The results are also shown in Table 2.

COMPARATIVE EXAMPLE 2

Example 1 was repeated except for using a polyvinyl alcohol having a polymerization degree of 1,000 and a degree of hydrolysis of 89 mol%. The results are also shown in Table 2.

COMPARATIVE EXAMPLE 3

Example 1 was repeated except for using a mixture of a polyvinyl alcohol having a polymerization degree of 550 and a degree of hydrolysis of 80 mol% and a polyvinylpyrrolidone having a polymerization degree of 1,000 in a weight ratio of 9 to 1. The results are also shown in Table 2.

COMPARATIVE EXAMPLE 4

Example 1 was repeated except for using polymer [M]. The results are also shown in Table 2.

extruder at 170° C. and pelletizing the extruded melts using a pelletizer.

The pellets thus obtained were blown into a film having the shape of a flattened cylinder, which had a folded length of 10 cm and a thickness of 35 μm at a die temperature of 170° C. using a tubular film formation machine.

After the film had been cut to 10 cm, the one end of a cut piece was sealed by heatsealing. The bag thus prepared was charged with 20 g of commercial synthetic washing powder (liquid weakly alkaline; pH of 1% aqueous solution at 25° C.: 10.5; ZAB, made by Kao Corporation) and the open end was heatsealed. The package thus prepared was allowed to stand still under conditions of 40° C. and 60% RH for 3 months. The package was then placed in water (temperature: about 20° C.) and, with stirring, tested for the solubility of the film. The water solubility of the film was good and the film dissolved completely in 1 minute. Much bubbling caused by the washing agent was observed.

COMPARATIVE EXAMPLE 5

Films having a thickness of 35 μm were obtained by casting a 13% aqueous solution of 100 parts of a polyvinyl alcohol having a polymerization degree of 450 and a degree of hydroysis of 82 mol%, 3 parts of sorbitol, 2 parts of mannitol and 4 parts of glycerine in the same manner as in Example 9.

A package containing a washing agent in the film

TABLE 2

| Example or Comparative Example | Polymer used | "Touch" evaluation 20° C., 40% RH | "Touch" evaluation 20° C., 84% RH | Water solubility test; time required for complete dissolution (sec) | | | | Breakage test (pcs/ 10 pcs) |
|---|---|---|---|---|---|---|---|---|
| | | | | Before heat treatment | After heat treatment | Sodium carbonate | Citric acid | |
| Example 1 | Polymer [A] | good | good | 25 | 27 | 28 | 27 | 0 |
| Example 2 | Polymer [B] | good | good | 28 | 33 | 38 | 32 | 0 |
| Example 3 | Polymer [C] | a little hard | a little tacky | 16 | 16 | 14 | 15 | 2 |
| Example 4 | Polymer [D] | good | good | 30 | 38 | 75 | 55 | 0 |
| Example 5 | Polymer [E] | good | good | 42 | 42 | 37 | 30 | 0 |
| Example 6 | Polymer [F] | a little hard | good | 27 | 43 | 50 | 45 | 1 |
| Example 7 | Polymer [G] | hard | good | 21 | 40 | 44 | 41 | 2 |
| Example 8 | Polymer [H] | hard and fragile | good | 20 | 51 | 42 | 40 | 3 |
| Comparative Example 1 | Polyvinyl alcohol (*1) | good | good | 35 | 125 | (°4) >300 | 175 | 0 |
| Comparative Example 2 | Polyvinyl alcohol (*2) | good | good | 32 | (°4) >300 | (°4) >300 | (°4) >300 | 0 |
| Comparative Example 3 | Mixture of polyvinyl alcohol and polyvinylpyrrolidone (*3) | a little hard | a little tacky | 28 | 110 | (°4) >300 | 150 | 2 |
| Comparative Example 4 | Polymer [M] | hard and fragile | good | 21 | 62 | 44 | 43 | 7 |

(*1): Polymerization degree: 550, degree of hydrolysis: 80 mol %
(*2): Polymerization degree: 1,000, degree of hydrolysis: 89 mol %
(*3): Mixture of a polyvinyl alcohol having a polymerization degree of 550 and a degree of hydroysis of 80 mol % and a polyvinylpyrrolidone having a polymerization degree of 1,000 in a weight ratio of 9 to 1.
(*4): Complete dissolution not attainable in 300 seconds.

It is clear from Table 2 that the water soluble films of the present invention are far superior to conventional polyvinyl alcohols in the water solubility after an accelerated crystallization by heat treatment and resistances to alkali and acid. In particular, the water soluble films formed in Examples 1 and 2 are excellent in the above characteristics.

EXAMPLE 9

Pellets were obtained by mixing 100 parts of Polymer [A], 3 parts of sorbitol, 2 parts of mannitol and 4 parts of glycerine, then melt extruding the mixture through an thus obtained was tested in the same manner as in Example 9.

The film had a poor water solubility and did not break after 1 minute. No bubbling caused by washing agent was observed.

Comparison of the result of Example 9 with that of Comparative Example 5 clearly shows that the water soluble film of the present invention can exhibit a high water solubility even when a washing agent is packed in it.

EXAMPLES 10 THROUGH 14

Films having a thickness of 50 μm and a width of 16 cm were obtained from polymers [A], [B], [E], [I] and [J] by melt formation through an extruder equipped with a T-die having a lip clearance of 0.3 mm at a die temperature of 185° C. All the polymers showed good melt formability.

The 5 types of the films thus obtained were subjected, in the same manner as in Example 1, to the water solubility test using the films as they were, ones heat treated, ones contacted with sodium carbonate decahydrate and ones contacted with citric acid, and to the breakage test using packages containing sodium carbonate decahydrate in the films. The results are summarized in Table 3.

TABLE 3

| Example | Polymer used | Water solubility test; time required for complete dissolution (sec) | | | | Breakage test (pcs/10 pcs) |
| --- | --- | --- | --- | --- | --- | --- |
| | | Before heat treatment | After heat treatment | Sodium carbonate | Citric acid | |
| 10 | Polymer [A] | 33 | 34 | 35 | 34 | 0 |
| 11 | Polymer [B] | 35 | 39 | 43 | 39 | 0 |
| 12 | Polymer [E] | 45 | 47 | 43 | 41 | 0 |
| 13 | Polymer [I] | 24 | 24 | 23 | 24 | 2 |
| 14 | Polymer [J] | 28 | 29 | 29 | 28 | 0 |

COMPARATIVE EXAMPLE 6

Film formation by melt extrusion was attempted in the same manner as in Example 10 using a mixture of a polyvinyl alcohol having a polymerization degree of 550 and a degree of hydrolysis of 80 mol% and a polyvinylpyrrolidone having a polymerization degree of 1,000 in a weight ratio of 9 to 1. No satisfactory film could be obtained at any formation temperature.

EXAMPLE 15

Pellets were obtained by mixing 100 parts of polymer [A] and 5 parts of glycerine, then melt extruding the mixture through an extruder at 170° C. and pelletizing the extruded melts using a pelletizer.

The pellets thus obtained were blown into a film having a flattened cylinder shape, which had a folded length of 10 cm and a thickness per sheet of 25 μm at a die temperature of 170° C. using a tubular film formation machine.

The film was conditioned at 20° C., 84% RH for 1 day and then visually checked for surface conditions. Separately, the film was cut to 8 cm and the one end of a cut piece was sealed by heatsealing. The bag thus prepared was charged with 30 g of commercial synthetic washing powder (liquid weakly alkaline; pH of 1% aqueous solution at 25° C.: 10.2; NEW BEADS, made by Kao Corporation) and the open end was heatsealed. The package thus prepared was allowed to stand still under conditions of 40° C. and 60% RH for 3 months. The package was then placed in water (temperature: about 20° C.) and, with stirring, tested for the solubility of the film. The results are shown in Table 4.

EXAMPLES 16 THROUGH 18

Tests were conducted in the same manner as in Example 15 except that the type of polymers used and the amount of glycerine added were changed. The results are also shown in Table 4.

COMPARATIVE EXAMPLE 7

Film formation by tubular film formation process was attempted in the same manner as in Example 15 using instead of polymer [A] a polyvinyl alcohol having a polymerization degree of 550 and a degree of hydrolysis of 80 mol%. The polymer showed too high a melt viscosity to be formed into a film.

COMPARATIVE EXAMPLE 8

Example 15 was repeated except for using instead of polymer [A] a polyvinyl alcohol having a polymerization degree of 550 and a degree of hydrolysis of 80 mol% and changing the amount of glycerine added from 5 parts to 12 parts to obtain a film by tubular film formation process. The film thus obtained was tested in the same manner as in Example 15. The results obtained are also shown in Table 4.

TABLE 4

| Example or Comparative Example | Polymer used | Amount of glycerine added (parts/100 parts polymer) | Surface condition after being conditioned at 20° C., 84% RH for 1 day | Water solubility test |
| --- | --- | --- | --- | --- |
| Example 15 | Polymer [A] | 5 | good | Washing agent released in 1 minute. Film dissolved completely in 3 minutes. |
| Example 16 | Polymer [B] | 3 | " | Washing agent released in 1 minute. Film dissolved completely in 3 minutes. |
| Example 17 | Polymer [I] | 4 | " | Washing agent released in 1 minute. Film dissolved completely in 3 minutes. |
| Example 18 | Polymer [J] | 5 | " | Washing agent released in 1 minute. Film dissolved completely in 3 minutes. |
| Comparative Example 8 | Polyvinyl alcohol (*1) | 12 | Glycerine bleeds out and the film becomes | Film does not break in 3 minutes |

TABLE 4-continued

| Example or Comparative Example | Polymer used | Amount of glycerine added (parts/100 parts polymer) | Surface condition after being conditioned at 20° C., 84% RH for 1 day | Water solubility test |
|---|---|---|---|---|
| | | | tacky. | |

(*1)Polymerization degree: 550, degree of hydrolysis: 80 mol %.

Comparison of the results of Example 10 through 18 with those of Comparative Examples 6 through 8 clearly shows that the water soluble films of the present invention are excellent in melt formability and also in resistances to alkali and acid.

EXAMPLE 19

An aqueous solution of 100 parts of polymer [A] and 10 parts of sorbitol in 890 parts of water was prepared. Using the solution a film having a thickness of 40 μm was obtained by casting with a drum-type film formation machine at a drum temperature of 70° C. The film thus obtained was conditioned at 20° C. and 65% RH and held tight between a pair of board paper sheets each having a hole of 3×3 cm, and the set was then fixed using a stapler. The set was immersed in an aqueous solution (20° C.) prepared by dissolving 0.05 part of sodium perborate in 400 parts of distilled water and the time required for the complete dissolution of the film was measured (hereinafter the test of this kind is referred to as "resistance to borate ion test").

Separately, the film was made into bags having a size of 5 cm×10 cm. The bags thus prepared were each charged with a mixture of 0.1 g of sodium perborate and 30 g of sodium carbonate decahydrate or a mixture of 0.1 g of sodium perborate and 30 g of citric acid and sealed with a heatsealer. The packages thus prepared were allowed to stand still for 2 months under conditions of 40° C. and 80% RH. After 2 months, the bags were opened and, after thorough removal of the contents, subjected to the above resistance to borate ion test.

The breakage tests were also conducted in the same manner as in Example 1.

The results are shown in Table 5.

EXAMPLES 20 THROUGH 24

Example 19 was repeated except for using one type each from among polymers [A], [B], [K] and [L] and using a sugaralchol each in an amount shown in Table 5 instead of 10 parts of D-sorbitol. The results are also shown in Table 5.

COMPARATIVE EXAMPLE 9

Example 19 was repeated except for using a polyvinyl alcohol having a polymerization degree of 550 and a degree of hydrolysis of 80 mol%. The results are also shown in Table 5.

COMPARATIVE EXAMPLE 10

Example 19 was repeated except for using a mixture of a polyvinyl alcohol having a polymerization degree of 550 and a degree of hydrolysis of 80 mol% and a polyvinylpyrrolidone having a polymerization degree of 1,000 in a weight ratio of 9 to 1. The results are also shown in Table 5.

TABLE 5

| Example or Comparative Example | Polymer used | Linear sugaralcohol used [amount used (parts/100 parts polymer)] | Resistance to borate ion test; time required for complete dissolution | | | Breakage test (psc/10 pcs) |
|---|---|---|---|---|---|---|
| | | | non-contact treated | Sodium carbonate | Citric acid | |
| Example 19 | Polymer [A] | D-sobitol [10] | 24 | 26 | 27 | 0 |
| Example 20 | Polymer [B] | D-mannitol [8] | 27 | 37 | 33 | 0 |
| Example 21 | Polymer [K] | dulcitol [6] | 15 | 17 | 16 | 2 |
| Example 22 | Polymer [L] | D-sorbitol [5] | 39 | 85 | 65 | 0 |
| Example 23 | Polymer [A] | L-iditol [14] | 25 | 26 | 26 | 0 |
| Example 24 | Polymer [B] | D-sorbitol [3] | 48 | 95 | 88 | 0 |
| Comparative Example 9 | Polyvinyl alcohol (*1) | D-sorbitol [10] | 155 | (*3) >300 | (*3) >300 | 0 |
| Comparative Example 10 | Mixture of polyvinyl alcohol and polyvinyl pyrrolidone (*2) | D-sorbitol [10] | 135 | (*3) >300 | (*3) >300 | 2 |

(*1): Polymerization degree: 550, degree of hydrolysis: 80 mol %
(*2): Mixture of a polyvinyl alcohol having a polymerization degree of 550 and a degree of hydrolysis of 80 mol % and a polyvinylpyrrolidone having a polymerization degree of 1,000 in a weight ratio of 9 to 1.
(*3): Complete dissolution not attainable in 300 seconds.

It is clear from Table 5 that the water soluble films of the present invention are excellent in the resistance to borate ion.

EXAMPLE 25

Pellets were obtained by mixing 100 parts of polymer [A], 5 parts of sorbitol, 5 parts of mannitol and 5 parts of glycerine, then melt extruding the mixture through an extruder at 170° C. and pelletizing the extruded melts using a pelletizer.

The pellets thus obtained were blown into a film having the shape of a flattened cylinder, which had a folded length of 8 cm and a thickness of 25 μm at a die temperature of 170° C. using a tubular film formation machine.

After the film had been cut to 10 cm, the one end of a cut piece was sealed by heatsealing. The bag thus prepared was charged with a mixture of 10 g of a commercial synthetic washing powder (liquid weakly alkaline; pH of 1% aqueous solution at 25° C.: 10.7; KAO ATTACK, made by Kao Corporation) and 0.1 g of sodium perborate, and the open end was heatsealed. The package thus prepared was allowed to stand still under conditions of 40° C. and 60% RH for 3 months.

The package was then placed in water (temperature: about 20° C.) and, with stirring, tested for the solubility of the film. The water solubility of the film was good and the film dissolved completely in 1 minute. Much bubbling caused by the washing agent was observed.

COMPARATIVE EXAMPLE 11

Films having a thickness of 25 μm were obtained by casting a 13% aqueous solution of 100 parts of a polyvinyl alcohol having a polymerization degree of 450 and a degree of hydrolysis of 82 mol%, 5 parts of sorbitol, 5 parts of mannitol and 5 parts of glycerine in the same manner as in Example 1. A package containing a washing agent in the film thus obtained was tested in the same manner as in Example 25.

The film had a poor water solubility and did not break after 1 minute. No bubbling caused by washing agent was observed.

Comparison of the result of Example 25 with that of Comparative Example 11 clearly shows that the water soluble film of the present invention can exhibit a high water solubility even when a washing agent comprising sodium borate added therein is packed in it.

Obviously, numerous modifications and variations of the present invention are possible in light of the above teachings. It is therefore to be understood that within the scope of the appended claims, the invention may be practiced otherwise than as specifically described herein.

What is claimed is:

1. A water soluble polyvinyl alcohol film formed from a copolymer consisting essentially of vinyl alcohol units, vinyl ester units and copolymerization units containing the 2-pyrrolidone ring, wherein the degree of hydrolysis of said polyvinyl alcohol is 65-98% and the content of said copolymerization units containing the 2-pyrrolidone ring is 1 to 20 mol%.

2. The water soluble film of claim 1, wherein the content of copolymerization units containing the 2-pyrrolidone ring is 2 to 12 mol%.

3. The water soluble film of claim 2, wherein the content of said copolymerization units containing the 2-pyrrolidone is 2–8 mol%.

4. The water soluble film of claim 1, wherein said 2-pyrrolidone ring has a formula I:

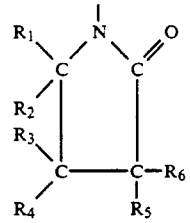

wherein $R_1$ to $R_6$ each represent hydrogen or an alkyl group.

5. The water soluble film of claim 4, wherein substituents $R_1$–$R_6$ are each hydrogen.

6. The water soluble film of claim 1, wherein the degree of hydrolysis of said polyvinyl alcohol is 65 to 95 mol%.

7. The water soluble film of claim 1, wherein the content, X (mol%) of said copolymerization units containing the 2-pyrrolidone ring and the degree of hydrolysis Y (mol%), of said polyvinyl alcohol satisfy the following relationships:

$$2 \leq X \leq 8$$

$$65 \leq Y \leq 95$$

$$76 - X \leq Y \leq 80 + 3.6\,X$$

8. A water soluble film comprising the polyvinyl alcohol defined in claim 1 and a sugar alcohol having b 4 to 6 carbon atoms.

9. A process for preparing a water soluble film, which comprises:
melt forming, in the substantial absence of water, the polyvinyl alcohol defined in claim 1.

10. The process of claim 9, wherein the melt flow index of said polyvinyl alcohol, as determined from the amount melt-extruded through a dye at 190° C. and under a load of 2.16 kg, is 0.1 to 100 g/10 min.

* * * * *